March 5, 1963 S. N. GLASBRENNER 3,080,082
METHOD OF IMPROVING TORQUE STRENGTH OF MOLDED CLOSURES
Filed May 26, 1960
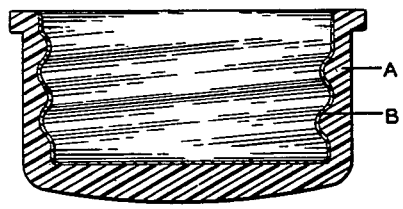
INVENTOR.
STANLEY N. GLASBRENNER United States Patent Office 3,080,082
Patented Mar. 5, 1963

3,080,082
METHOD OF IMPROVING TORQUE STRENGTH OF MOLDED CLOSURES
Stanley N. Glasbrenner, West Hempfield Township, Lancaster County, Pa., assignor to Armstrong Cork Company, Lancaster, Pa., a corporation of Pennsylvania
Filed May 26, 1960, Ser. No. 31,793
6 Claims. (Cl. 215—43)

This invention relates to a method of improving the effective torque strength of molded closures, more particularly molded closures formed from thermosetting molding compositions.

The use of molded closures formed from thermosetting molding compositions for the sealing of glass containers is widespread in the industry. In some instances, however, difficulty has been experienced when applying the molded closures or caps to containers in that it has been found that a certain percentage of the molded closures break using conventional production facilities. This is often due to the use of excessive sealing forces by the operators operating the capping machines at the factory locations. Where the excessive sealing forces are minimized by proper adjustments of the capping machines, the above-encountered difficulties are often eliminated or minimized so that there is little experience with breakage. However, operators are inclined to maximize the sealing forces of the individual machines for which they are responsible in order to insure that the goods bottled on the machines are 100% sealed; that is, no molded closure can be dislodged from the container using the particular control methods in force in the particular plant for insuring that the containers are properly sealed. In certain instances, the torque applied may be several times the recommended level for a particular type of closure.

In order to overcome the breakage encountered under such circumstances, it has been suggested that the design of the molded closure be modified such that the particular portion of the cap subject to breakage may be reinforced by an extra amount of molding resin. This would probably provide an answer to the problem except that the mold modifications may be both difficult and costly and the use of additional resin in closure members would result in additional costs.

The primary object of this invention is to provide a method of improving the effective torque strength of molded closures so as to minimize or eliminate breakage of the closure on capping machines.

Another object of this invention is to provide a method of increasing the effective torque strength of the molded closures without modification of closure design.

In the accompanying drawing, the FIGURE illustrates a cross-sectional view of a molded coslure A having a thin coating B on the interior threaded portion thereof resulting from allowing to dry thereon a stable aqueous dispersion containing suspended colloidal silica particles and a dispsersed organic film-forming material.

These and other objects have been accomplished by the application of a special surface treatment to the interior threaded portion of the molded closure. The special surface treatment results in an increase in the co-efficient of friction of the closure on a glass container with a resultant material increase in the effective strength of such closure when measured in torque-inch-pounds application force. The special surface treatment is achieved by drying a thin coating of colloidal silica particles which are suspended in a stable aqueous dispersion of an organic film-forming material on the threaded portion of the molded closure.

The solutions of this invention which are particularly well adapted for the special surface treatment to the interior threaded portion of the molded closures for improving their effective torque strength comprise colloidal particles of silica in the form of discrete, uniform spheres, which are negatively charged by the incorporation of a small amount of alkali in the product, uniformly suspended throughout an aqueous dispersion of an organic film-forming material. The organic film-forming material may be a naturally occurring resinous material such as shellac or copal, a modified natural resin such as the rosin esters-maleic anhydride adduct products, synthetic resinous materials containing carboxylic groups of low molecular weight such as styrene-maleic anhydride adducts and ethylene-maleic anhydride adducts, and various synthetic resins of high moleclular weight such as acrylic, polyvinyl acetate and styrene-acrylic adduct polymers which are dispersed through emulsification. Generally speaking, the solutions of this invention comprise, a relative proportions, from 11 to 30 parts by weight of colloidal silica and from 2 to 25 parts by weight of an organic film-forming material to 1,000 parts by weight water.

The amount of organic film-forming material which is dispersed in the aqueous treating medium will vary dependent upon the particular film former used. By way of example, where naturally occurring resinous materials function as the organic film former, from 2 to 20 parts by weight film former may be used with 1,000 parts by weight water. The maleic anhydride rosin esters and the acrylic emulsion adducts may be present to the extent of from 5 to 25 parts by weight film former to 1,000 parts by weight water while the styrene-maleic anhydride copolymer may be present to the extent of from 2 to 10 parts by weight film former to 1,000 parts by weight water. In each of the several solutions, the colloidal silica may be present to the extent of from 11 to 30 parts by weight $SiO_2$ to 1,000 parts by weight water and is preferably present to the extent of from 21 to 24 parts by weight $SiO_2$ to 1,000 parts by weight water.

It will be readily evident that within the broader ranges of resinous film-forming materials given there will be preferred ranges; thus, the maleic anhydride copolymer adducts such the resin sold under the trade name LDX-840 (Monsanto Chemical Co.) are preferably present to the extent of from 5 to 10 parts by weight to 1,000 parts by weight water, the styrene-maleic anhydride copolymers such as the resin sold under the trade name Lytron 822 (Monsanto Chemical Co.) are preferably present to the extent of from 2.5 to 3.0 parts by weight to 1,000 parts by weight water, the maleic anhydride rosin esters such as the resins sold under the trade names Durez 15325 and Durez 19551 (Durez Plastics Division, Hooker Electro Chemical Co.) are preferably present to the extent of from 12 to 15 parts by weigth to 1,000 parts by weight water, and the acrylic emulsion adducts such as the resins sold under the trade names B-78 (Rohm & Haas and RWL-201 (Morton Chemical Co.) are preferably present to the extent of from 12 to 15 parts by weight to 1,000 parts by weight water. Generally speaking, organic film-forming materials which are readily dispersed in slightly alkaline aqueous systems and which are compatible with the suspended colloidal silica particles may be utilized in the practice of this invention.

To provide stable solutions for use in production-type spray equipment, small amounts of surfactants and de-foaming or leveling agents may be added as needed as would be well understood by one skilled in the art. Optionally, small amounts of preservative compositions may be added to insure against bacteria or mold growth.

The following example describes a preferred embodiment of this invention which has been chosen for purposes of illustration and description.

EXAMPLE 1

To 908.3 parts by weight water are added, with stirring: 81.8 parts by weight of an aqueous colloidal silica sol containing 30% colloidal silica by weight as $SiO_2$ in an alkaline solution (ratio, weight $SiO_2:Na_2O=295$) sold under the trade name Ludox HS by E. I. du Pont de Nemours; 2.7 parts by weight of an alkaline soluble styrene-maleic anhydride addition copolymer; 0.9 part by weight of sodium-o-phenyl phenate; 1.8 parts by weight of dodecyl-benzene sulphonate; and 4.5 parts by weight of tributoxy ethyl phosphate.

Any alkaline aqueous sol of colloidal silica may be utilized in the practice of this invention. The discrete uniform spheres of silica are charged negatively by incorporating a small amount of alkali in the solution.

The styrene-maleic anhydride polymer above described is alkali soluble and may be prepared by heating styrene in the presence of maleic anhydride and the methyl half ester of maleic acid. The methyl acid ester in part reverts to anhydride and free alcohol during the polymerization and in part persists in the copolymer. Generally speaking, one mol of dicarboxylic components including the acid anhydride and half ester is reacted with 1 to 1.2 mols of styrene. One mol of acid anhydride is used with 0.2 to 1.5 mols of half ester.

The sodium-o-phenyl phenate ingredient of the above-described composition is a bacteria-mold growth retardant and other preservative compositions might equally as well be used. As a surfactant, dodecyl-benzene sulphonate was added, and it is contemplated that other surfactants such as xylene, sodium sulphonate, organic detergents of the alkyl aryl sulphonate type, and numerous others could be used in place of all or part of the dodecyl-benzene sulphonate. A small amount of a defoaming or leveling agent, tributoxy ethyl phosphate, was also added and the use of other defoaming or leveling agents in small amounts is contemplated. One preferred defoaming agent is a balanced blend of hydrocarbons, fatty esters, and metallic soaps, a nontoxic defoaming agent sold under the trade name Colloid 581-B by Colloids, Inc. of Newark, New Jersey.

When sprayed on the interior threaded section of a molded closure, the above-described solutions remain essentially colorless and cannot be readily detected by the unaided eye. They are both nontoxic and nonreactive with the plastic composition from which the molded closures are formed. Since the above-described solutions are in the form of dilute aqueous suspensions, they may be applied either by spraying, wiping, or as a wash for the closures although possibly a spray is most advantageous insofar as it distributes a very thin layer of particles over a closely defined region on the interior of the closure. Spray treatment of the solutions of this invention fits well into normal operation and the solutions can be readily applied as a post operation to the closures without interfering with normal production.

The application of this material to molded closures results in the deposit of a very thin, probably monomolecular, layer, and the solution has no effect on the plastic surface and shows no absorption or deterioration of the plastic material.

In order to demonstrate the efficiency of the application of the solution to molded closure caps for improving the torque strength of the molded closures, a series of molded closures formed from a phenolic molding composition was treated by spraying the solution of Example 1 onto the interior threaded sections of the closures. Closures thus treated were tightened onto a bottle in order to determine the point at which the treated closures broke. A series of results of such testing is shown in the following table, untreated closures being used as controls.

Table

| Torque-inch-pounds | 24 mm. Phenolic Jigger or Deep Skirt Closure | | 28 mm. Phenolic Jigger or Deep Skirt Closure | |
|---|---|---|---|---|
| | Controls | Treated | Controls | Treated |
| 100 | | x | | |
| 95 | | x | | |
| 90 | | x | | |
| 85 | | xxxxx | | |
| 80 | | xxxx | | xx |
| 75 | | xxxx | | x |
| 70 | x | xx | | xxxx |
| 65 | xx | xxx | xx | xx |
| 60 | | xxx | xxxxx | xxx |
| 55 | xxxxxxxx | | xxxx | xx |
| 50 | xxxxxxx | | xx | x |
| 45 | xx | | x | |
| 40 | | | x | |
| High | 70 | 100 | 65 | 80 |
| Low | 45 | 60 | 40 | 50 |
| Average | 54.1 | 76.9 | 55.7 | 65.67 |
| Percent Gain Torque Strength | 42.2 | | 17.9 | |

As shown above, the phenolic closures examined were of two sizes, 24 mm. and 28 mm. They were formed from a molding composition comprised of 50% to 55% phenol-formaldehyde resin, 40% to 45% wood fiber filler and approximately 5% pigment (carbon black). Each cap contained a trace of the mold release agent, calcium stearate. The treated caps, the threaded portion of which was located deep in the skirt, were prepared by spraying the solution with a radially operating 360° coverage, Paasche industrial spray gun, after which they were dried for 10 to 20 minutes at room temperature.

In measuring the effective torque strength of the closures, a torque meter reading force in torque-inch-pounds was used. A glass bottle is held firm on the meter in a vise arrangement and the closure then applied and screwed tight to the bottle to the point of breakage, the scale of the meter indicating the torque force being applied to the closure in torque-inch-pounds.

The results in the table clearly illustrate the improved torque strength achieved with caps treated in accordance with the method of this invention. This increase in strength has minimized and eliminated closure breakage without adjustments to the sealing forces exerted by the capping machines in production where breakage of untreated closures had previously presented problems.

I claim:

1. A method of improving the effective torque strength of a molded resin closure having an interior threaded portion which comprises applying a thin coating of colloidal silica particles suspended in a stable aqueous dispersion of an organic film-forming material to the interior threaded portion of said molded closure and drying said coating on the interior threaded portion of said closure.

2. A method of improving the effective torque strength of a molded resin closure having an interior threaded portion comprising applying a thin coating containing relative proportions of 11.0 to 30.0 parts by weight colloidal silica and 2.0 to 25.0 parts by weight organic film former dispersed in 1,000 parts by weight water to the interior threaded portion of said molded closure and drying said coating on the interior threaded portion of said closure.

3. In a method of improving the effective torque strength of a molded resin closure having an interior threaded portion the improvement which comprises applying a thin coating to the interior threaded portion of said closure and drying said coating on the interior threaded portion of said closure, the thin coating comprising a stable aqueous dispersion containing in relative proportions 11.0 to 30.0 parts by weight colloidal silica particles, 2.0 to 25.0 parts by weight of an alkaline dispersible organic film-forming material selected from the group consisting of a naturally occurring resinous material, a modified naturally occurring resinous material, a low molecular weight synthetic resin containing carboxylic groups and mixtures thereof, and 1,000 parts by weight water.

4. In a method of improving the effective torque strength of a molded resin closure having an interior threaded portion the improvement which comprises applying a thin coating in the form of a stable aqueous dispersion containing in relative proportions 11.0 to 30.0 parts by weight colloidal silica particles, 5.0 to 25.0 parts by weight emulsified high molecular weight synthetic resinous film-forming material, and 1,000 parts by weight water to the interior threaded portion of said molded closure and drying said coating on the interior threaded portion of said closure.

5. A molded resin closure having an interior threaded portion with a thin coating on the interior threaded portion thereof of the dried residue of a stable aqueous dispersion containing suspended colloidal silica particles and a dispersed organic film-forming material.

6. A molded resin closure having an interior threaded portion with a thin coating of colloidal silica particles and an organic film-forming material adhered to the interior threaded portion thereof.

References Cited in the file of this patent

UNITED STATES PATENTS

| | | |
|---|---|---|
| 2,431,873 | Kennelly | Dec. 2, 1947 |
| 2,527,329 | Powers et al. | Oct. 24, 1950 |
| 2,586,775 | Benner et al. | Feb. 26, 1952 |
| 2,634,048 | Wilson | June 23, 1953 |
| 2,693,427 | Kingsford | Nov. 2, 1954 |

OTHER REFERENCES

Zimmerman: Material Trade Names, Supplement 1—1956, Ludox, page 131, Industrial Research Service, Inc., Dover, N.H.